United States Patent [19]

Bruno, Jr. et al.

[11] Patent Number: 4,560,564
[45] Date of Patent: Dec. 24, 1985

[54] TEXTURED PROTEIN TOMATO SAUCE PRODUCTS

[75] Inventors: David J. Bruno, Jr.; Michael J. Dodds; Debra L. Fuqua; John E. Hunter, all of Cincinnati, Ohio

[73] Assignee: The Procter & Gamble Company, Cincinnati, Ohio

[21] Appl. No.: 652,163

[22] Filed: Sep. 19, 1984

Related U.S. Application Data

[63] Continuation-in-part of Ser. No. 546,675, Oct. 28, 1983, abandoned.

[51] Int. Cl.$^4$ .......................... A23L 1/275; A23L 1/39
[52] U.S. Cl. ..................................... 426/250; 426/252; 426/540; 426/104; 426/589; 426/397; 426/399; 426/401; 426/521
[58] Field of Search ............... 426/589, 104, 250, 252, 426/540, 397, 399, 401, 521

[56] References Cited

U.S. PATENT DOCUMENTS

| | | |
|---|---|---|
| 3,399,064 | 8/1968 | Partyka et al. |
| 3,443,964 | 5/1969 | Marotta et al. ..................... 426/589 |
| 3,873,753 | 3/1975 | Nelson et al. |
| 3,925,561 | 12/1975 | Herstel et al. |
| 3,961,083 | 6/1976 | Coleman . |
| 4,447,461 | 5/1984 | Loos .................................. 426/589 |

OTHER PUBLICATIONS

Francis, F. J., Food Colorimetry: Theory & Applications, AVI Publishing Co., Inc., Westport, CT, pp. 179-197, 393-404 (1975).
Yeatman, J. N., "Tomato Color Standards Need Revision", Food Technology, pp. 50-54, Nov. (1976).
Yeatman, J. N., "Tomato Products: Read Tomato Red?", Food Technology, pp. 20-29, May (1969).
Davis, R. B., and Gould, W. A., "The Effect of Processing Methods on the Color of Tomato Juice", Food Technology, pp. 540-547, Nov. (1955).
Snider, N., ed., Soy Protein Recipe Ideas, Institutions/-Volume Feeding Management Magazine, Chicago, IL (1971).
"Retail Sales Bloom for Soy-Based Meat Extender", Food Product Development, vol. 13, No. 8, pp. 66-67, Aug. (1979).
Jacobs, L. C., "Texturized Soy Protein Plus Seasonings Equal a Variety of Dinner Entrees", Food Development, vol. 15, No. 6, pp. 46-47, Jun. (1981).
Priestley, R. J., Effects of Heating on Foodstuffs, Applied Science Publishers Ltd., London, England, pp. 173-193, 199-208, 291-305 (1979).
Gould, W. A., Tomato Production, Processing & Quality Evaluation, AVI Publishing Co., Inc., Westport, CT, pp. 228-244.
Sognefest, P., & Jackson, J. M., "Pre-Sterilization of Canned Tomato Juice", Food Technology, vol. 1, No. 1, pp. 78-84 (1947).
National Canners Assoc. Table on Hot-Fill-Hold-Cool Procedures for Various High Acid Products in Calif., Western Research Laboratories, Berkeley, CA, Apr. (1966).
Andres, C., "Hot-Fill Shelf-Stable Liquid Products in Paperboard Containers", Food Processing, pp. 78-79, Mar. (1982).
21 C.F.R., §113, 114.

Primary Examiner—Jeanette M. Hunter
Attorney, Agent, or Firm—Nancy S. Mayer; Edmund F. Gebhardt; Richard C. Witte

[57] ABSTRACT

An edible shelf-stable tomato sauce product of optimal color containing textured protein or a mixture of textured protein and meat has been developed. Upon separation of the textured protein, the screened sauce has a color at 70° F. (21° C.) of from about 20.5 to about 25 Hunter "L" units, from about 18.5 to about 25 Hunter "a" units, and from about 11.5 to about 15 Hunter "b" units. A preferred process for the preparation of this product employs a combination of high-temperature-short-time commercial sterilization and hot-fill-hold processing.

28 Claims, No Drawings

TEXTURED PROTEIN TOMATO SAUCE PRODUCTS

RELATED APPLICATION

This is a continuation-in-part application of Ser. No. 546,675, filed Oct. 28, 1983 now abandoned.

TECHNICAL FIELD

This invention relates to a tomato-based sauce product containing textured protein or a mixture of textured protein and meat, and to a process for the preparation of such a sauce which yields product within an optimal color range.

BACKGROUND OF THE INVENTION

A demand exists for meat substitutes which are nutritionally equal to or better than meat, but which are not as costly. In response to this demand, several protein products have been developed and are available commercially for use in foods. Vegetable proteins are available as flours, concentrates, isolates, and in various textured forms well known in the art. Use of textured proteins in food products as meat substitutes or meat extenders is desirable to provide consumers with convenient low-cost nutritious meals.

Unfortunately, obstacles exist to greater use of textured proteins in food for human consumption. Deficiencies in product flavor, texture, and appearance can result in poor consumer acceptability. Product color is important to consumer preference of foods. For tomato products, consumers associate a redder, darker color with optimum maturity of the raw product and consequently with better flavor. Conversely, a browner product may indicate the use of less mature raw material which would impart a bitter taste. Degradation of red color could also be due to improper processing or storage, or to product spoilage. Color standards exist for raw tomatoes as well as for several processed tomato products.

In tomato products containing textured protein, the protein should have the brown colors of meat. Textured protein materials lack the brown color of cooked meats. Use of colorants with textured proteins is not always effective due to color leaching in the presence of water. U.S. Pat. No. 3,925,561 of Herstel et al., issued Dec. 9, 1975, discloses use of a $C_5$ sugar or phosphate ester of a $C_5$ sugar to color vegetable protein dark brown in a manner such that the color does not leach out when the protein comes into contact with water during later rehydration, cooking or processing.

Products containing textured protein are known in the art. U.S. Pat. No. 3,961,083 of Coleman, issued June 1, 1976, discloses a textured vegetable protein product which can be mixed with seasonings to prepare a barbecue meat-like product for use in sloppy joes, chili, and the like. No color ranges are defined for these products. A process for producing product of optimal color or for rendering the barbecue product storage stable is not disclosed. This lack of attention to product color is likely to contribute to an absence of widespread use of such products.

It has now been found that the production of a shelf-stable tomato-based sauce product containing textured protein using conventional processing techniques can result in product of an undesirable color. Retort processes, high-temperature-short-time commercial sterilization, and hot-fill-hold packing techniques are well known in the processing of tomato products. Application of these processes in the manufacture of tomato products containing textured protein often results in product of poor color quality. It is desirable to have shelf-stable tomato sauce products of acceptable color containing textured protein in order to provide the consumer with an appetizing and nutritious substitute for the meat-containing products currently available.

It is therefore an object of the present invention to provide a tomato-based sauce product containing textured protein having an optimal color acceptable to consumers.

It is a further object of the present invention to provide a tomato-based sauce product containing textured protein which is shelf stable.

It is a further object of the present invention to provide a process for the preparation of a shelf-stable, tomato-based sauce product containing textured protein.

It is a further object of the present invention to provide a process for the preparation of a shelf-stable, tomato-based sauce product of acceptable color containing textured protein.

These and other objects of the invention will be obvious from the following descriptions and examples.

DISCLOSURE OF THE INVENTION

This invention relates to shelf-stable, tomato-based meat-type sauces containing textured protein such as spaghetti sauces, taco sauces, barbecue sauces, chili sauces and the like. A new and improved, edible, shelf-stable tomato sauce product of optimal color containing textured protein has been developed comprising: (a) tomatoes, (b) textured protein, (c) seasonings and spices, and (d) colorant, wherein upon separation of the textured protein, the screened sauce has a color at 70° F. (21° C.) of from about 20.5 to about 25 Hunter "L" units, from about 18.5 to about 25 Hunter "a" units and from about 11.5 to about 15 Hunter "b" units. The product may also contain a mixture of textured protein and meat.

Additionally, this invention comprises a process for the preparation of a shelf-stable tomato sauce product with acceptable color containing textured protein comprising: (a) high-temperature-short-time commercial sterilization of tomatoes with seasonings and spices, (b) addition of a mixture of textured protein, colorant, and optional spices and flavorings, and (c) hot-fill-hold processing of the resulting product.

DESCRIPTION OF PREFERRED EMBODIMENTS

Product

This invention comprises a shelf-stable, tomato-based sauce food product containing textured protein having a specific color range found acceptable to consumers. Additionally, this invention comprises a process for the preparation of such a sauce product.

The term "sauce product" as used herein includes tomato-based meat-type sauces such as spaghetti sauces, taco sauces, barbecue sauces, chili sauces, and the like, which contain textured protein or a mixture of meat and textured protein. The following definitions provide descriptions of suitable ingredients for the components of the sauce product of the present invention.

The term "textured protein" includes all textured protein materials well known in the art, as well as textured single-cell proteins. Mixtures of textured vegetable protein or textured single-cell protein with up to about 90%, but preferably less than about 50% of materials of animal origin, including egg albumin, meat, meat juices, chicken, fish, serum blood, meat by-products, hydrolyzed animal protein, and the like, are also included. The textured protein is most preferably a textured vegetable protein. The textured protein is present in the sauce product at levels of from about 1% to about 15% by weight. Preferably, the textured protein is present at a level of from about 2% to about 10% by weight of the product.

The term "analog" or "meat analog" as used herein denotes protein which has been texturized, such as by extrusion cooking, comminuted, mixed with some or all of the following: seasonings, spices, colorants, other proteins, binder, water and fat, and then heat set, and sized to a suitable particle size. The analog is present in the sauce product at levels of from about 5% to about 70% by weight. Preferably, the analog is present at a level of from about 10% to about 50% by weight of the product.

The term "tomatoes" as used herein includes the fruit in several forms, such as raw tomatoes, crushed tomatoes, processed tomatoes, tomato paste, tomato puree, and the like.

The term "seasonings" includes condiments for enhancing the flavor of food products, primarily chopped vegetables such as onion, garlic, bell pepper, carrots, celery, and the like, as well as conventional seasonings such as salt, pepper, sugar, and others. These may be in dehydrated, powdered, oleoresin, or other conventional forms well known in the art.

The term "spices" includes various aromatic plants and herbs used to enhance the flavor of foods, such as oregano, basil, bay leaf, parsley, and others well known in the art. These may be in flaked, dehydrated, powdered, oleoresin, or other conventional known forms.

The term "caramel" as used herein denotes the coloring and flavoring agent formed by heating sugar to an amorphous brown and somewhat bitter state.

The term "screened sauce" denotes the tomato sauce product of the present invention with the textured protein and any other large particles removed by filtration through a screen, i.e. the filtrate. The screen size preferably employed is U.S. Mesh 10.

The terms "screened protein" or "screened analog" as used herein denote the textured protein and any other large particles removed from the product of the present invention by filtration through a screen. The screen size preferably employed is U.S. Mesh 10.

The color of the sauce product of the present invention has been created to achieve maximum acceptability to the consumer. Subtle changes in color shade are associated with variations in food quality. This invention provides a sauce containing tomatoes, textured protein, seasonings and spices, and colorant, such that upon separation of the textured protein, the screened sauce has a color at about 70° F. (21° C.) of from about 20.5 to about 25 Hunter "L" units, from about 18.5 to about 25 Hunter "a" units, and from about 11.5 to about 15 Hunter "b" units.

Preferably, in the sauce product of the present invention upon separation of the textured protein, the screened sauce has a color at about 70° F. (21° C.) of from about 21 to about 24.5 Hunter "L" units, from about 18.5 to about 24 Hunter "a" units, and from about 12 to about 14.5 Hunter "b" units. Most preferably, in the sauce product of the present invention upon separation of the textured protein, the screened sauce has a color at about 70° F. (21° C.) of from about 21 to about 23 Hunter "L" units, from about 22 to about 24 Hunter "a" units, and from about 12 to about 13 Hunter "b" units.

The units used to define the color of the sauce product are units of light reflectance. A non-homogeneous product inherently has more variability in light reflectance. By separating the textured protein and other large particles by means of a screen, a more precise color range can be determined for the protein and the remaining sauce individually than can be determined for the product as a whole. Thus, color ranges are defined for the screened sauce.

The Hunter color scale values utilized herein to define color are units of color measurement in the well-known Hunter color system. A complete technical description of the system can be found in an article by R. S. Hunter, "Photoelectric Color Difference Meter", Journal of the Optical Society of America, Vol. 48, pp. 985 to 995, 1958. Devices specifically designed for the measurement of color on the Hunter scales are described in U.S. Pat. No. 3,003,388 to Hunter et al., issued Oct. 10, 1961. In general, Hunter color values are based upon measurements of tri-stimulus color. The Hunter "L" scale values are units of light reflectance measurement or luminosity, and the higher the value is the lighter the color is since a lighter colored material reflects more light. In particular, in the Hunter color system the "L" scale contains 100 equal units of division. Absolute black is at the bottom of the scale ($L=0$), and absolute white is at the top of the scale ($L=100$). Thus, in measuring Hunter color values of the sauce product of this invention the lower the "L" scale value the darker the sauce color. In the Hunter color system the "a" scale measures color hue and chroma between red and green. As the "a" scale value decreases, the sauce appears more brown. The "b" scale measures color hue and chroma between blue and yellow. As the "b" scale value decreases, the sauce appears less brown and less orange. Hue is analogous to the dominant wavelength, while chroma relates to the color purity.

The total color difference between two products can be calculated from the following formula:

$$\Delta E = [(\Delta L)^2 + (\Delta a)^2 + (\Delta b)^2]^{\frac{1}{2}}$$

wherein delta E is the total color difference between two samples, delta L is the difference in "L" units between the two samples, delta a is the difference in "a" units between two samples, and delta b is the difference in "b" units between two samples. Interpreting the magnitude of color differences has the advantage that each attribute can be weighed according to its importance. For tomato products, color hue as measured by the "a" and "b" units is much more important visually than lightness or darkness as measured by the "L" units.

The present invention relates to a shelf-stable, tomato-based sauce product having a screened sauce color with specific ranges defined for Hunter "L", "a", and "b" units. A $\Delta E$ value of about 4 is calculated by inserting the midpoint and either outer limit for each of the "L", "a", and "b" ranges previously defined for the screened sauce of the claimed product into the above-stated formula. When comparing the claimed product to other sauce products, the "L", "a", and "b" units are measured for each product and inserted into the above-stated formula. If the resulting ΔE is less than 4, the color difference between the product of the present invention and the compared product is moderately small. The difference in color magnitude between the product of the present invention and the compared product could be less than the difference inherent in two samples of the product of the present invention. The present invention therefore comprises a shelf-stable, tomato-based sauce product having a total color difference, ΔE, of less than 4 for the screened sauce when compared to the screened sauce of other tomato-based products containing textured protein as a component.

In order to achieve the desired color range, the product of the present invention can contain suitable colorants. Both red and brown colorants approved for use in food products are suitable for use in the present invention, such as roxanthin red and brown lakes. Other colorants which can be used include natural coloring agents, such as paprika, caramel, grape, and tomato colorants. Preferably, caramel is used in the product to color the protein component. If coloring of the sauce component is required, paprika is preferred.

When paprika is employed as a colorant, it can be used at any suitable level which can be determined by those skilled in the art. Preferably, it is used at a level of 0.2% by weight of the total product in order to avoid imparting a paprika flavor to the sauce. However, higher levels can be employed if the paprika does not have an adverse effect on flavor. In order to obtain the desired color range the paprika must be water-dispersible in the form of a colloidal suspension. Such a suspension can be prepared from paprika in the form of an extract, oleoresin, spice, and the like. The paprika itself must be of a proper color in order to assure the correct final product color. For example, a 0.1% by weight solution of paprika extract in water having a Hunter "L" unit of 23.7, "a" unit of 24.5, and "b" unit of 15.8, is suitable for use in the present invention. The proper color and level of paprika must be determined for each new tomato crop due to color variation in the tomatoes. If the crop is of high quality no paprika or other color additive is needed for the sauce component.

The pH of the sauce product of the present invention ranges from about 4.0 to about 6.0, preferably from about 4.0 to about 5.0, and most preferably from about 4.3 to about 4.6. Proper product pH is essential for optimal color. Caramel colorants are known to be colloidal in nature with the particles held in solution partially by small electrical charges. Two types are available, those which carry negative and those which carry positive charges. Caramels can be produced with properties compatible to their end use. Their isoelectric point is the pH at which the colloidal charge is electrically neutral and is one of their most important characteristics. The preferred caramel component of the present invention has an isoelectric negative charge to aid in its adherence to the textured protein. Changes in pH can cause caramel to diffuse into the sauce. When this occurs the product color darkens and appears more brown. Therefore, pH must be controlled in order to obtain optimum color.

The amount and type of fat present in the product also affect product appearance. Suitable fat levels for the screened sauce of the present invention range from about 0.05% to about 10% by weight of the composition. Preferably the fat comprises from about 1% to about 8% by weight of the composition. A higher level of fat will result in greater product reflectance and in an orange appearance. A lower level of fat decreases reflectance and provides a more desirable red color. Liquid fat is preferable to solid fat. Agitation during the high-temperature-short-time processing reduces the particle size of solid fat. This results in increased surface area and a greater reflectance. The resulting product appears more orange in color. Liquid fat, on the other hand, retains a larger droplet size during processing compared to the solid fat particle size, and therefore the product has less reflectance and appears more red. The preferred liquid fat maintains its liquid form at ambient room temperature of about 70° F. (21° C.) or higher. Suitable antioxidants may be employed with the liquid fat to retard degradation.

The sauce product of the present invention can contain meat as an optional ingredient. Meat can be present at levels up to about 65% by weight of the product.

In addition to pH and fat level and type, the type of processing also affects product color.

PROCESS

Any of the conventional processes known for the manufacture of shelf-stable tomato products can be employed in this invention, such as retorting, high-temperature-short-time sterilization, or hot-fill-hold processing. The various processing parameters are adjusted to achieve a commercially sterile shelf-stable product within the desired optimal color range.

The preferred process for the preparation of a shelf-stable tomato sauce product with acceptable color containing textured protein comprises: (a) high-temperature-short-time commercial sterilization of the tomatoes with seasonings and spices; (b) addition of a mixture of textured protein, colorant, and optional seasonings and spices; and (c) hot-fill-hold processing of the resulting product. It is well known in the art to use high-temperature-short-time commercial sterilization or hot-fill-hold packing techniques in order to prevent flavor and color degradation of tomato products during processing. It has been found, however, that use of only high-temperature-short-time commercial sterilization for the product of the present invention can result in a product which appears too orange in color. An acceptable color for the sauce product can be obtained using a combination of processing techniques. If the protein component containing colorant is added after the high-temperature-short-time commercial sterilization of the remaining sauce components followed by processing with hot-fill-hold techniques, an improved product color is achieved.

In the process of the present invention the tomatoes, seasonings and spices, fat and other minor ingredients are combined with heating to a temperature of from about 100° F. (38° C.) to about 150° F. (66° C.) for about 2 hours. The sauce pH is adjusted to about 3.8 to about 4.5 by use of a food-compatible acid. The pH of the mixture can be determined by standard analytical techniques such as that defined in 21 CRF §114.90.

This mixture is then subjected to high-temperature-short-time processing for cooking and commercial sterilization. High-temperature-short-time processing was developed to provide a means of destroying acid-tolerant, heat-resistant spoilage organisms which could not be destroyed by conventional processes without a severe loss in the flavor and quality of the tomato product. The process relies upon two principles: First, the increase in rate of heat penetration affected in high-efficiency heat exchangers decreases the processing time needed to heat the product to a given temperature. Second, the use of a high processing temperature for a short time reduces the degree of chemical change in the product for a given sterilization value.

Coil, plate, and tubular heat exchangers have all been used in high-temperature-short-time processing. Certain conditions should be considered in judging the merits of a particular type of equipment, such as the thermal efficiency, ease of cleaning of the heat exchanger surfaces, and available means of automatic control of times and temperatures. A swept wall heat exchanger is preferred for use herein.

The heat exchanger must be designed to withstand the pressures necessary to pump the required amount of product through the equipment, as well as being capable of heating the product to the sterilizing temperature. The pressure throughout the heat exchanger should exceed the pressure of saturated steam at the maximum temperature in the heater, to avoid boiling within the heat exchanger, which reduces heat transfer efficiency. The pump used must maintain a positive constant flow rate against the pressures necessary to force the product through the heat exchanger. This is especially important because flow rate through the heat exchanger will determine the time-temperature exposure of the product. Preferably, the high-temperature-short-time equipment is operated under automated control to maintain the desired commercial sterilizing times and temperatures.

Any high-temperature-short-time system can be used. Units such as those available in the U.S. from Crepaco, Inc. and Cherry-Burrell Corp., and from Alpha-Laval deLaval of Sweden are useful herein.

In practice, the high-temperature-short-time method consists of heating the product rapidly and continuously to a temperature of from about 220° F. (104° C.) to about 280° F. (137° C.) in a heat exchanger for a time appropriate to achieve sterilization. In general, about 5 seconds to about 60 seconds time is sufficient at temperatures from about 245° F. (118° C.) to about 280° F. (138° C.) to commercially sterilize the product. The product is then rapidly cooled by flashing the steam off through release of pressure or by passing the product through a heat exchanger at lower temperatures. The product is cooled in this manner to a temperature of from about 140° F. (60° C.) to about 160° F. (71° C.).

The textured protein component is separately prepared in the following manner prior to addition to the sterilized tomato sauce. A meat analog is prepared from extrusion cooked protein. Several techniques for extrusion cooking are known in the art. Fat, flavors, seasonings, spices, acidulants, and color, can be added during extrusion cooking, or mixed with the protein after cooking in combination with water and binder proteins. The binder and protein are then heat set, preferably in the presence of oil. The binder is most preferably added after, and not prior to, the extrusion cooking step to preserve its functionality necessary for cross-linking with the extrudate mixture during heat setting. The cross-linked analog is then sized to produce a suitable particle size distribution.

The textured protein component can then optionally be mixed with meat, preferably in ground or chunk form. The mixture is added to the sterilized tomato sauce and heated and held at a temperature of from about 180° F. (82° C.) to about 220° F. (104° C.) for about 20 minutes. The food product is then packed in hermetically sealed containers by a hot-fill-hold technique. While "hermetically sealed containers" is usually used to refer to jars and cans, it can be appreciated that newer aseptic packages, such as plastic and foil plastic laminate pouches, can also be adapted to this process. In hot-fill-hold processing the container is filled with product at a temperature of at least about 180° F. (82° C.) and held for about 2 to 5 minutes, preferably about 3 minutes, before cooling. In the hot-fill-hold process it is extremely important to assure this high closing temperature for each and every container. Without a high closing temperature the temperature of the product prior to closing may drop below temperatures which are effective to pasteurize any vegetative bacteria, yeast and molds on the inner surfaces of the container. Therefore, time between container filling and container sealing is preferably minimized. In the event the process is stopped, such as by equipment breakdown, containers in transit between filling and sealing operations will probably cool excessively and will need to be reprocessed, reheated or scraped.

After the container is sealed it is important that portions of the container not contacted by product be heated to the same temperature as the product. For example, if jars are filled with product, a post-capping hot water spray directed at the lid and headspace of the jar can be used to provide for lid and headspace heating. Alternatively, the jars can be inverted after filling and capping for the desired hold time to provide for lid and headspace sterilization. The product is then cooled to storage temperatures.

It can be appreciated that still other executions of this invention can be devised without departing from its scope and spirit and without losing its advantages. Minor processing parameters and product ingredients can be altered without departing from the scope of the invention. In particular, processing of a tomato-based sauce product containing textured protein, wherein the protein is added after initial heating of other ingredients, however practiced, results in product of improved color. Product within the color ranges defined is that preferred by consumers.

The following examples illustrate the inventions described herein, but are not intended to define the limits thereof. All percentages are by weight unless otherwise stated.

EXAMPLE 1

A spaghetti sauce was prepared according to the following formula:

| Ingredient | Weight Percent |
| --- | --- |
| Tomatoes | 38.2 |
| Spices and Seasonings | 3.7 |
| Citric Acid | 0.1 |
| Oil | 2.6 |
| Meat analog | 16.5 |
| Water | 38.9 |

The tomatoes, spices and seasonings, citric acid, oil, and water, were combined in a 50 gallon Hamilton kettle with a steam-heated jacket and heated to about 120° F. (49° C.) with agitation over a period of about 2 hours. The pH of the mixture was adjusted. The mixture was then heated to 160° F. (71° C.) and thermally processed by passing through a Crepaco VT460 swept surface heat exchanger to achieve high-temperatureshort-time commercial sterilization. The temperature was raised to 255° F. (124° C.), maintained for 45 seconds, and then cooled to about 140° F. (60° C.). Meat analog prepared from textured vegetable protein containing caramel, adjusted in pH, and heat set with a binder in the presence of oil, was added and the product heated to about 190° F. (88° C.) in about 25 minutes. The product was then held at about 190° F. (88° C.) for about 20 minutes. Several jars were then filled with product, capped, inverted, and cooled.

After cooling to room temperature the product was screened. The product was first heated in a water bath to about 100°–120° F. (38°–49° C.). The product was then poured through a screen. The filtrate was used to determine sauce color. The color of the screened sauce was measured at 70° F. (21° C.) by means of a Hunter Lab D25-9 colorimeter with type B head. Data are presented in Table I.

TABLE I

| | Hunter color units | | |
|---|---|---|---|
| | L | a | b |
| Sauce | 22.7 | 22.3 | 13.3 |

EXAMPLE 2

Product was prepared according to the following formula:

| Ingredient | Weight Percent |
|---|---|
| Tomatoes | 34.4 |
| Spices, seasoning, and colorant | 3.3 |
| Citric acid | 0.1 |
| Oil | 2.5 |
| Meat analog | 19.7 |
| Ground beef | 2.5 |
| Water | 37.5 |

The colorant added was roxanthin red. Processing was as in Example 1 except that the meat analog containing caramel was added before the high-temperature-short-time commercial sterilization process. The product was packed using the hot-fill-hold technique of Example 1. Product color was measured as in Example 1 and the resulting data are present in Table II. All sauce color units were outside of the optimal ranges for acceptable product color. The product appeared orange in color due to the formulation and processing differences.

TABLE II

| | Hunter color units | | |
|---|---|---|---|
| | L | a | b |
| Sauce | 27.2 | 30.3 | 16.4 |

EXAMPLE 3

Product was prepared according to the following formula:

| Ingredient | Weight Percent |
|---|---|
| Tomatoes | 34.4 |
| Spices and seasonings | 3.54 |
| Citric acid | 0.03 |
| Oil | 2.53 |
| Meat analog | 20.0 |

-continued

| Ingredient | Weight Percent |
|---|---|
| Water | 39.5 |

Processing was as in Example 1 except that the textured protein was fried in (1) solid vegetable shortening, (2) a liquid fat with a solids content of 1% to 2% at 70° F. (21° C.), and (3) a liquid oil with a solids content of 0% at 70° F. (21° C.). Product color was measured as in Example 1 and the resulting data for the screened sauce are presented in Table III. Product prepared with liquid oil had color units closer to the center of the optimal range.

TABLE III

| | Hunter color units | | |
|---|---|---|---|
| | L | a | b |
| (1) Solid fat | 24.5 | 23.1 | 14.0 |
| (2) Liquid fat with 1%–2% solids | 23.6 | 23 | 13.7 |
| (3) Liqiud oil | 22.7 | 22.5 | 12.9 |

EXAMPLE 4

Product was prepared according to the following formula:

| Ingredient | Weight Percent |
|---|---|
| Tomatoes | 35.1 |
| Spices and seasonings | 3.6 |
| Oil | 2.5 |
| Meat analog | 20.0 |
| Water | 38.8 |

Processing was as in Example 1 except that the textured protein pH was adjusted in one run and was not adjusted in a separate run. Product color was measured as in Example 1 and the resulting data for the screened sauce are presented in Table IV. The product with pH adjustment was more brown in appearance than the product without pH adjustment.

TABLE IV

| | Hunter color units | | |
|---|---|---|---|
| | L | a | b |
| pH not adjusted | 23.7 | 23.9 | 13.6 |
| pH adjusted | 23 | 22.1 | 12.9 |

EXAMPLE 5

Product was prepared according to the formula and process of Examples 1 and 2, and also by a hot-fill-hold technique. Food colorants were added to several samples of the product. Betalain, caramel, and roxanthin red were added in various combinations at various levels. Hunter color measurements were obtained for all product. The appearance of the original and colored products was compared to a leading commercially available product by a panel of experts. Each sample was graphed according to color on a scale of orange=1 to red=15, and on a scale of increasing brown from 1 to 10. These responses were then related to the Hunter ranges. Within the broad Hunter ranges of 21 to 27 "L" units, 18 to 28 "a" units, and 12 to 16.5 "b" units, no preference for either the commercial product or the product of the present invention was demonstrated. For the product of the present invention within the Hunter ranges of 21 to 25 "L" units, 18.5 to 25 "a" units, and 12 to 15 "b" units, preference was increased by 4%. For the product of the present invention with the Hunter ranges of 21 to 24.5 "L" units, 18.5 to 24 "a" units, and 12 to 14.5 "b" units, preference was increased by 8%. Therefore, the latter two Hunter ranges define in general the optimal color range and preferred optimal color range for the product of the present invention.

What is claimed is:

1. An edible, shelf-stable sauce product comprising:
   (a) tomatoes;
   (b) textured protein;
   (c) seasonings and spices; and
   (d) having a pH of from about 4.0 to about 6.0
   wherein upon separation of the textured protein, the screened sauce has a color at 70° F. (21° C.) of from about 20.5 to about 25 Hunter "L" units, from about 18.5 to about 25 Hunter "a" units, and from about 11.5 to about 15 Hunter "b" units.

2. The sauce product of claim 1 further comprising meat in ground or chunk form.

3. The sauce product of claim 2 wherein meat comprises up to about 65% by weight of the product.

4. The sauce product of claim 1 wherein the screened sauce has a color at about 70° F. (21° C.) of from about 21 to about 24.5 Hunter "L" units, from about 18.5 to about 24 Hunter "a" units, and from about 12 to about 14.5 Hunter "b" units.

5. The sauce product of claim 1 wherein the screened sauce has a color at 70° F. (21° C.) of from about 21 to about 23 Hunter "L" units, from about 22 to about 24 Hunter "a" units, and from about 12 to about 13 Hunter "b" units.

6. The sauce product of claim 1 which has a pH of from about 4.0 to about 5.0.

7. The sauce product of claim 1 which has a fat content of from about 0.05% to about 10% by weight of the screened sauce.

8. The sauce product of claim 7 wherein the fat is liquid in form at a temperature of 70° F. (21° C.).

9. The sauce product of claim 1 wherein the textured protein comprises from about 1% to about 15% by weight of the product.

10. The sauce product of claim 9 wherein the textured protein comprises from about 2% to about 10% by weight of the product.

11. The sauce product of claim 10 wherein the textured protein is soy protein.

12. A spaghetti sauce according to claim 11.

13. The sauce product of claim 1 wherein the textured protein comprises from about 5% to about 70% by weight of the product.

14. The sauce product of claim 13 wherein the textured protein comprises from about 10% to about 50% by weight of the product.

15. A spaghetti sauce according to claim 14.

16. The sauce product of claim 1 wherein the colorant comprises a red color additive.

17. The sauce product of claim 16 wherein the colorant comprises paprika.

18. The sauce product of claim 1 wherein the colorant comprises a brown color additive.

19. The sauce product of claim 18 wherein the colorant is caramel.

20. The sauce product of claim 19 wherein the caramel has a negative charge.

21. An edible, shelf-stable sauce product comprising:
   (a) tomatoes;
   (b) textured protein in an amount of from about 1% to about 15% by weight;
   (c) seasonings and spices; and
   (d) caramel;
   having a pH of from about 4.0 to about 5.0, wherein upon separation of the textured protein, the screened sauce has a color at 70° F. (21° C.) of from about 20.5 to about 25 Hunter "L"0 units, from about 18.5 to about 25 Hunter "a" units and from about 11.5 to about 15 Hunter "b" units.

22. A process for the preparation of a shelf-stable, tomato-based sauce product containing textured protein comprising the steps of:
   (a) a high-temperature-short-time commercial sterilization of tomatoes with seasonings and spices;
   (b) addition of a mixture of textured protein, and optional colorant, seasonings, and spices; and
   (c) hot-fill-hold processing of the resultant product, wherein the tomatoes, seasonings and spices are rapidly heated to a temperature within the range of from about 220° F. (104° C.) to about 280° F. (137° C.) for a time of about 5 seconds to about 60 seconds, wherein the textured protein and colorant are added to the sterilized mixture and held at a temperature within the range of about 180° F. (82° C.) to about 220° F. (104° C.), wherein the resultant product is packed into containers at a temperature within the range of from about 180° F. (82° C.) to about 220° F. (104° C.), and wherein upon separation of the texture protein, the screened sauce has a color at 70° F. (21° C.) of from about 20.5 to about 25 Hunter "L" units, from about 18.5 to about 25 Hunter "a" units, and from about 11.5 to about 15 Hunter "b" units.

23. The process of claim 22 wherein the containers are hermetically sealed and held at a temperature of at least about 85° C. for a time of at least about 3 minutes.

24. The process of claim 22 wherein the tomato-based sauce product has a pH of from about 4.0 to about 6.0.

25. The process of claim 24 wherein the tomato-based sauce product contains from about 1% to about 15% by weight of textured protein.

26. The process of claim 25 wherein the tomato-based sauce product contains liquid fat in an amount of from about 0.05% to about 10% by weight of the screened sauce.

27. The process of claim 22 further comprising mixing meat with the textured protein and colorant.

28. The process of claim 26 wherein the tomato-based sauce product comprises spaghetti sauce.

* * * * *

UNITED STATES PATENT AND TRADEMARK OFFICE
CERTIFICATE OF CORRECTION

PATENT NO. : 4,560,564
DATED : December 24, 1985
INVENTOR(S) : David J. Bruno, Jr. et al.

It is certified that error appears in the above-identified patent and that said Letters Patent are hereby corrected as shown below:

In Claim 1, at Col. 11, line 15, "(d) having" should read -- (d) colorant; having -- .

In Claim 22, at Col. 12, line 40, "texture protein" should read -- textured protein -- .

Signed and Sealed this

Eleventh Day of March 1986

[SEAL]

Attest:

DONALD J. QUIGG

Attesting Officer

Commissioner of Patents and Trademarks